United States Patent
Lohmeyer et al.

[11] Patent Number: 6,061,477
[45] Date of Patent: *May 9, 2000

[54] QUALITY IMAGE WARPER

[75] Inventors: Mark S. Lohmeyer, Somerville, Mass.; Peter Jeffrey Burt, Princeton; Gooitzen Siemen van der Wal, Hopewell, both of N.J.

[73] Assignee: Sarnoff Corporation, Princeton, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/838,101

[22] Filed: Apr. 15, 1997

Related U.S. Application Data
[60] Provisional application No. 60/015,577, Apr. 18, 1996.

[51] Int. Cl.[7] ...................................................... G06K 9/32
[52] U.S. Cl. .......................... 382/300; 382/293; 708/300
[58] Field of Search ................................... 382/268, 293, 382/295, 296, 298, 297, 299, 300, 301; 358/451, 525, 428; 348/581, 263, 583, 399, 580, 420; 364/724.011, 724.1; 345/433, 436–439, 427, 127–130; 708/300, 313

[56] References Cited

U.S. PATENT DOCUMENTS

| | | | |
|---|---|---|---|
| 3,700,815 | 10/1972 | Doddington et al. | 704/246 |
| 4,816,913 | 3/1989 | Harney et al. | 348/399 |
| 5,008,752 | 4/1991 | Van Nostrand | 348/581 |
| 5,157,481 | 10/1992 | Kashimura et al. | 348/263 |
| 5,173,948 | 12/1992 | Blackman et al. | 382/293 |
| 5,175,808 | 12/1992 | Sayre | 345/433 |
| 5,204,944 | 4/1993 | Wolberg et al. | 345/427 |
| 5,410,616 | 4/1995 | Kidd | 382/299 |
| 5,420,940 | 5/1995 | Sedlar et al. | 382/276 |
| 5,579,418 | 11/1996 | Williams et al. | 382/300 |
| 5,594,676 | 1/1997 | Greggain et al. | 364/724.011 |
| 5,642,167 | 6/1997 | Wallace et al. | 348/420 |

OTHER PUBLICATIONS

Sumitomo Metals, "SMI ASSP IP90C16 Image Rotation/Expansion/Reduction Processor (Affine)", 2 pages, Jan. 30, 1996.

Steve Gomez, "Real–time Bilinear Interpolation Using the TMC2301", TRW LSI Products Division, 17 pages, Jan. 21, 1988.

*Primary Examiner*—Leo H. Boudreau
*Assistant Examiner*—Ishrat Sherali
*Attorney, Agent, or Firm*—William J. Burke

[57] ABSTRACT

A digital image warper system produces a warped output image from an input image. The warper system increases the sampling rate of a sampled image above the Nyquist rate or samples an analog image at a higher rate than the Nyquist rate and prefilters the upsampled image to counteract filtering which may occur during the warping operation. The upsampled image is warped using an interpolator for resampling to produce a warped upsampled image. The interpolator is, for example, a low quality interpolator such as a bilinear interpolator. The warped image is then downsampled to the same resolution as the input image to produce the warped image. Down-sampling and warping can be combined into one step by modifying the geometric transformation function implemented when warping the upsampled image.

21 Claims, 10 Drawing Sheets

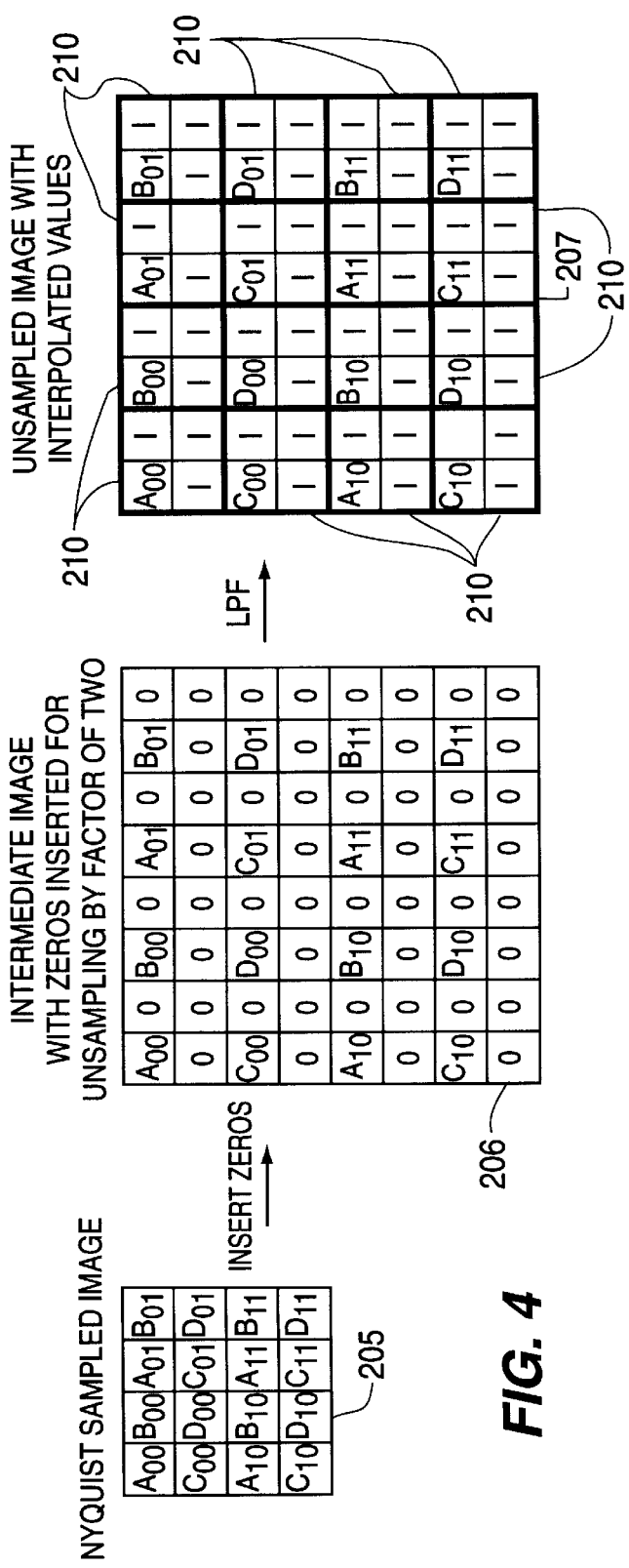
FIG. 4
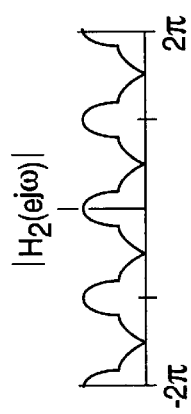
FIG. 5c
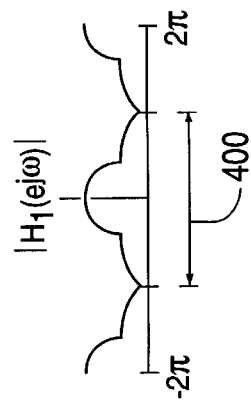
FIG. 5b
FIG. 5a

| $Z1_{00}$ | $Z2_{00}$ | $Z1_{01}$ | $Z2_{01}$ | $Z1_{02}$ | ... | $Z1_{0,255}$ | $Z2_{0,255}$ |
| $Z3_{00}$ | $Z4_{00}$ | $Z3_{01}$ | $Z4_{01}$ | $Z3_{02}$ | ... | $Z3_{0,255}$ | $Z4_{0,255}$ |
| $Z1_{10}$ | $Z2_{10}$ | $Z1_{11}$ | $Z2_{11}$ | $Z1_{12}$ | ... | $Z1_{1,255}$ | $Z2_{1,255}$ |
| $Z3_{10}$ | $Z4_{10}$ | $Z3_{11}$ | $Z4_{11}$ | $Z3_{12}$ | ... | $Z3_{1,255}$ | $Z4_{1,255}$ |
| $Z1_{20}$ | $Z2_{20}$ | $Z1_{21}$ | $Z2_{21}$ | $Z1_{22}$ | ... | ... | ... |
| ⋮ | ⋮ | ⋮ | ⋮ | ⋮ | ... | ... | ... |
| $Z1$ | $Z2$ | $Z1$ | $Z2$ | $Z1$ | ... | $Z1_{255,255}$ | $Z2_{255,255}$ |
| $Z3$ | $Z4$ | $Z3$ | $Z4$ | $Z3$ | ... | $Z3_{255,255}$ | $Z4_{255,255}$ |

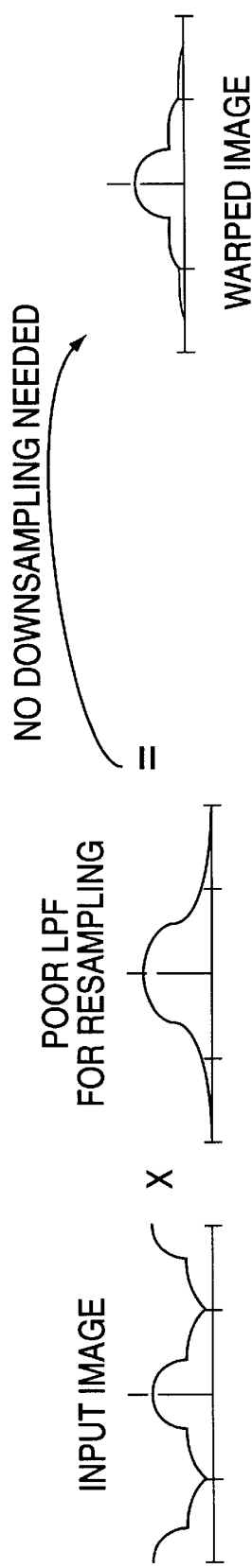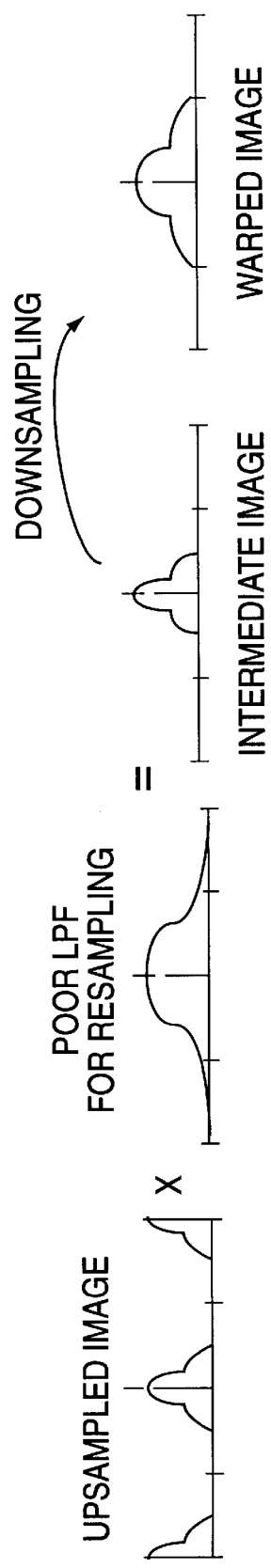

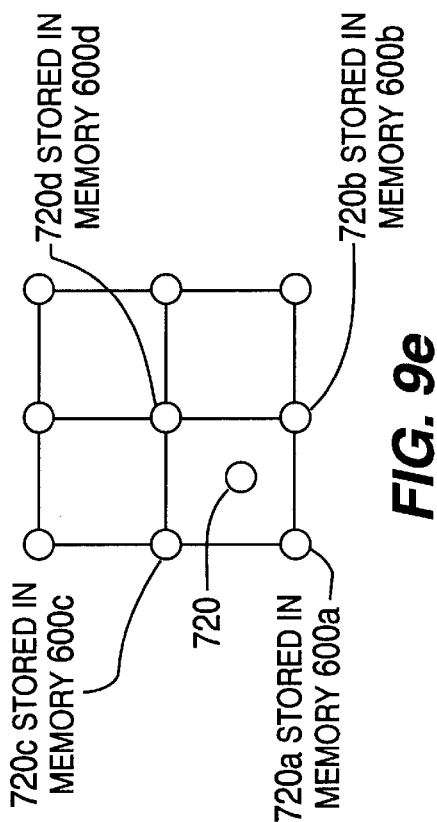
FIG. 9c
FIG. 9d
FIG. 9e
FIG. 9f

QUALITY IMAGE WARPER

This non-provisional U.S. national application, filed under 35 U.S.C. §111(a) claims, under 35 U.S.C. §119(e)(1), the benefit of the filing date of provisional U.S. application Ser. No. 60/015,577, filed under 35 U.S.C. §111(b) on Apr. 18, 1996.

FIELD OF THE INVENTION

This invention relates to a method and apparatus of digitally processing image data and, particularly, a method and apparatus for performing a high quality digital image warp.

BACKGROUND OF THE INVENTION

There are two basic components to an image warp: (1) spatial transformation and (2) resampling through interpolation. A spatial transformation defines a geometric relationship between each point in an input and a warped image.

Inverse mapping is typically used to generate the warped image from the input image. The inverse mapping specifies reference locations in the source image as a function of the current location in the warped image. Commonly, the locations in the warped image are processed sequentially to generate the warped image from the input image. At each integer position in the warped image, the location of a corresponding pixel value in the input image is calculated. The pixel addresses in the input image may not be integer values because the inverse mapping can be arbitrary. In other words, the inverse mapping maps a pixel value in the warped image to a pixel value in the input image which may be located between pixels in the input image. Therefore, it is desirable to use interpolation to generate the pixel value from the non-integral positions in the input image.

Typically, several pixels surrounding the referenced input location are used to compute the output pixel value in the warped image. The larger the number of pixels used, the more accurate the resampling. As the number of pixels increases, however, so does the cost and complexity of the hardware implementation.

Current hardware approaches for performing the interpolation required for resampling use a two-by-two neighborhood of pixels around the address value of the pixel in the source image to calculate each pixel value in the warped image. This is commonly called bilinear interpolation. Bilinear interpolation uses a local neighborhood of four pixels and a weighted average of those four pixels for the interpolation. For a real-time implementation four pixel values are accessed simultaneously every clock cycle. The four pixel values are then multiplied by the appropriate weights and summed to produce a pixel value in the warped image.

One such system for performing bilinear interpolation is described in *Real-time Bilinear Interpolation Using the TMC*2301 by Steve Gomez, TRW LSI Products Division, and dated Jan. 21, 1989. This system uses four separate memories that can be accessed in parallel when performing bilinear interpolation. The system also includes a look-up table for storing the coefficients to determine the weighted average. The weighting coefficients are multiplied by respective pixel values from the input image and, then, summed to produce a pixel value in the warped image. *Real-time Bilinear Interpolation Using the TMC*2301 is herein incorporated by reference for its teachings on bilinear interpolation.

The difficulty with this and other similar systems is when bilinear interpolation is no longer adequate. In applications that require repeated warping of the same image or subpixel translations, bilinear interpolation may produce poor results. Typically, bilinear interpolators, degrade the high spatial frequency components of an image to a greater extent than a higher quality interpolator.

The next higher quality interpolator uses a three-by-three pixel area in the input image to compute each pixel value in the warped image. The complexity and expense of this type warper dramatically increases relative to that of a bilinear interpolator. Nine separate memories, nine coefficients, and a nine term sum of products is required. In applications where size, power, and cost are at a premium, this is an unacceptable solution. If a better interpolation is required, for example, four-by-four or greater, this problem is compounded.

To overcome these shortcomings, a new warper method and system is provided.

SUMMARY OF THE INVENTION

The present invention is directed to a digital image warper system which produces a warped image from an input image. The warper system increases the sampling rate of a sampled image above the Nyquist rate or samples an analog image at a higher rate than the Nyquist rate. The upsampled image is warped using an interpolator for resampling to produce a warped upsampled image. The interpolator is, for example, a low quality interpolator such as a bilinear interpolator. The warped image is down sampled to the same resolution as the input image to produce the warped image. Down sampling and warping can be combined into one step by modifying the geometric transformation function implemented when warping the upsampled image.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawings, in which:

FIG. 4 is a data structure diagram illustrating the conceptual operation of upsampler 10 shown in FIGS. 2 and 3.

FIGS. 5(a)–5(c) are respective Fourier transforms which illustrate exemplary spatial frequency spectra of the input image signal 205, intermediate image signal 206, and upsampled image signal 207 shown in FIG. 4.

FIG. 9(a) shows respective Fourier transforms of the upsampled image signal 207, the intermediate warped image, and the warped image 700 illustrating the operation of the down sampler 30 in accordance with an exemplary embodiment of the present invention.

FIG. 9(b) is a Fourier transform of a input image signal using a bilinear interpolation which does not include upsampling of the input image signal.

FIGS. 9(c)–9(f) are enlarged views of the data structure diagram shown in FIG. 7.

DETAILED DESCRIPTION OF THE INVENTION

Overview

The exemplary embodiment of the present invention is directed to a digital image warper system which produces a warped image from an input image. The warper system increases the sampling rate of a sampled image above the Nyquist rate. Typically, digital images to be warped are sampled at the Nyquist rate. Increasing the sampling rate reduces the spatial frequencies represented by a fixed number of samples. The increased sampling rate is accomplished by sampling the analog image at a higher rate than the Nyquist rate or by digitally processing an already Nyquist sampled image to increase Its sampling rate (e.g. by doubling or tripling each sample). The later of these two approaches maintains the modularity of the warper system within a larger image processing system.

The upsampled image is warped, using an interpolator for resampling, to produce a warped upsampled image. The interpolator can be a relatively low quality interpolator such as a bilinear interpolator. The warped image is then down sampled to the same resolution as the input image to produce the warped image. Down sampling and warping can be combined into one component by modifying the geometric transformation function implemented when warping the upsampled image.

DESCRIPTION OF EXEMPLARY EMBODIMENTS

Figure 1:
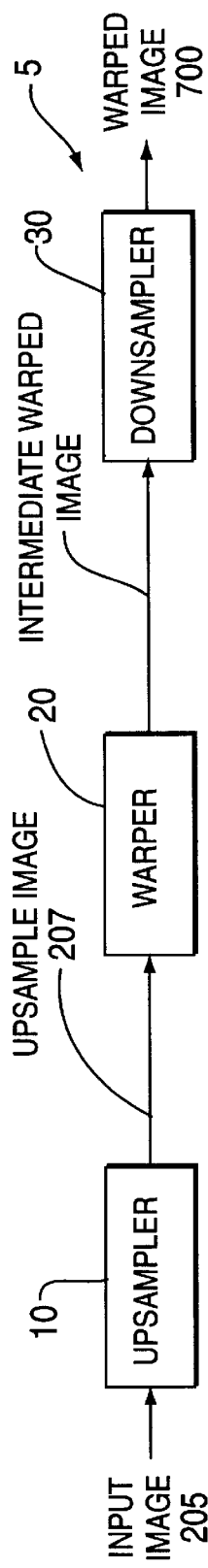
FIG. 1 is a block diagram of an exemplary embodiment of the present invention directed to a digital image warping system.

Referring now to the drawings, wherein like reference numerals refer to like elements throughout, FIG. 1 illustrates the digital image warping system 5 according to an exemplary embodiment of the present invention. An input image signal 205 is provided to upsampler 10. The input image signal 205 is sampled at or above the Nyquist rate and is a complete representation of the underlying analog image. Upsampler 10 interpolates the input image signal 205 by a factor of, for example, $2^N$, where N is a positive integer greater than zero, to increase the number of samples, i.e. pixel values, in the input image signal 205. Interpolation is not limited to a factor of $2^N$.

Upsampling is performed in the vertical and horizontal directions of the input image signal 205 using the same sample multiplication factor. For example, if the input image 205 has 512 pixel values by 512 pixel values, upsampling by a factor of two produces an upsampled image signal 207 having 1024 pixel values by 1024 pixel values. Upsampling by a factor of four produces an upsampled image signal 207 having a size of 2048 pixel values by 2048 pixel values. The input image signal 205 is, for example, 256 pixel values by 256 pixel values. Thus, upsampling by a factor of two produces an upsampled image signal 207 having 512 pixel values by 512 pixel values.

Alternatively, upsampler 10 can be provided an analog input signal. In this configuration, upsampler 10 samples the analog input signal at a rate of $2^N$ times the Nyquist rate to produce the upsampled image signal 207.

Figure 2:
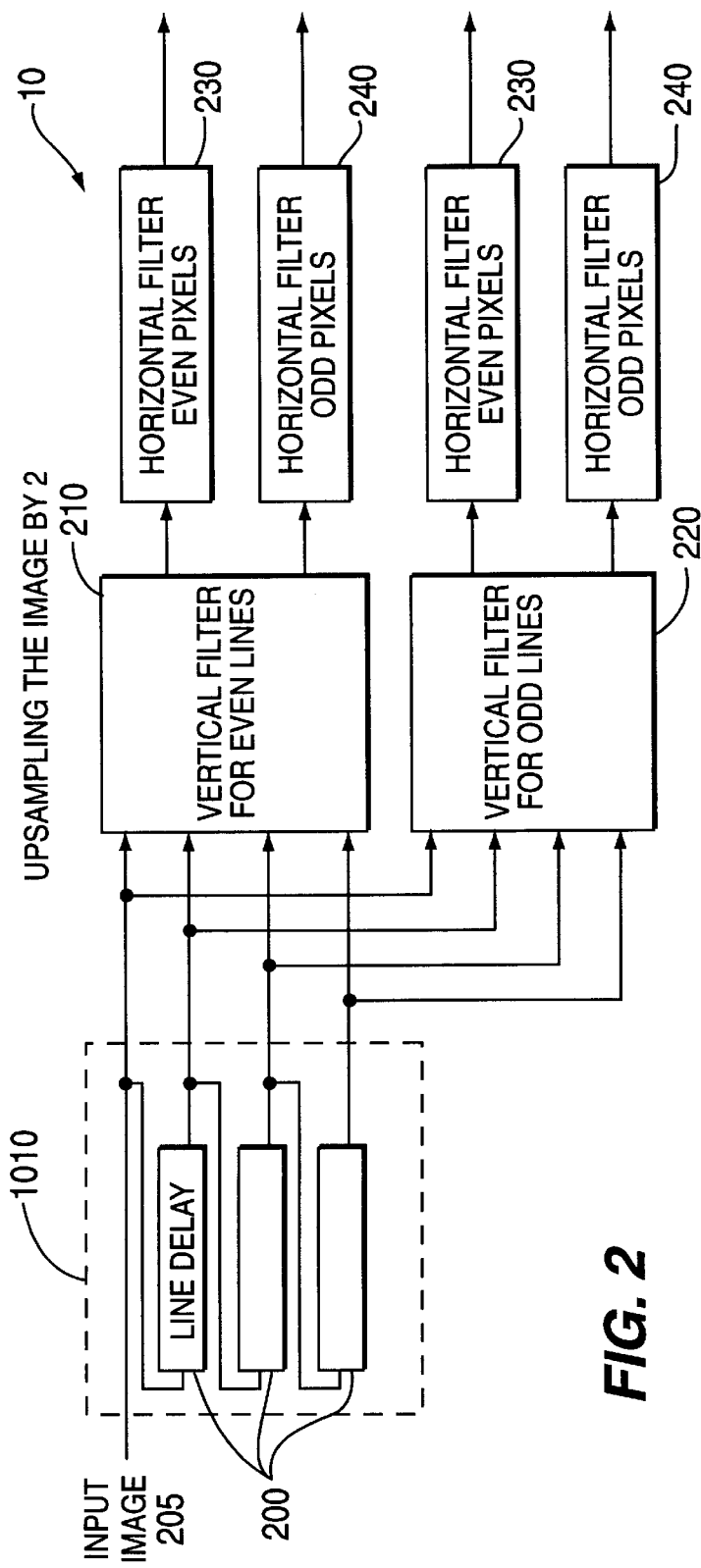
FIG. 2 is a block diagram of upsampler 10 shown in FIG. 1 according to an exemplary embodiment of the present invention.

Upsampler 10 is a high quality interpolation filter shown in FIG. 2. Upsampler 10 upsamples the input image signal 205 by a factor of two in both directions using a separable filter. Upsampler 10 slightly peaks the frequency components that will be attenuated by warper 20, shown in FIG. 1, to improve the image quality of the warped image.

The input image signal 205 is provided to vertical filter 210 and vertical filter 220 directly and via lines delays 200 each of which delays an entire line of the input image for one line period. Vertical filter 210 is a unity filter and passes the pixel values of the even lines of the input image signal 205. Vertical filter 220 is a four tap filter with the coefficient values selected to be a sum of the powers of 2. The coefficient values are −0.09375, 0.59375, 0.59375, and −0.09375 which are respectively −3/32, 19/32, 19/32, and −3/32. The multiplication operations used to implement vertical filter 220 are simplified to arithmetic shift and sum operations by using these coefficient values.

The pixel values from vertical filters 210 and 220 are provided to (1) horizontal filters 230 which are unity filters and pass the even pixel values and (2) horizontal filters 240 which are four tap filters. The coefficient values of horizontal filters 240 are selected to be a sum of the powers of 2 and are −0.09375, 0.59375, 0.59375, and −0.09375.

Figure 3:
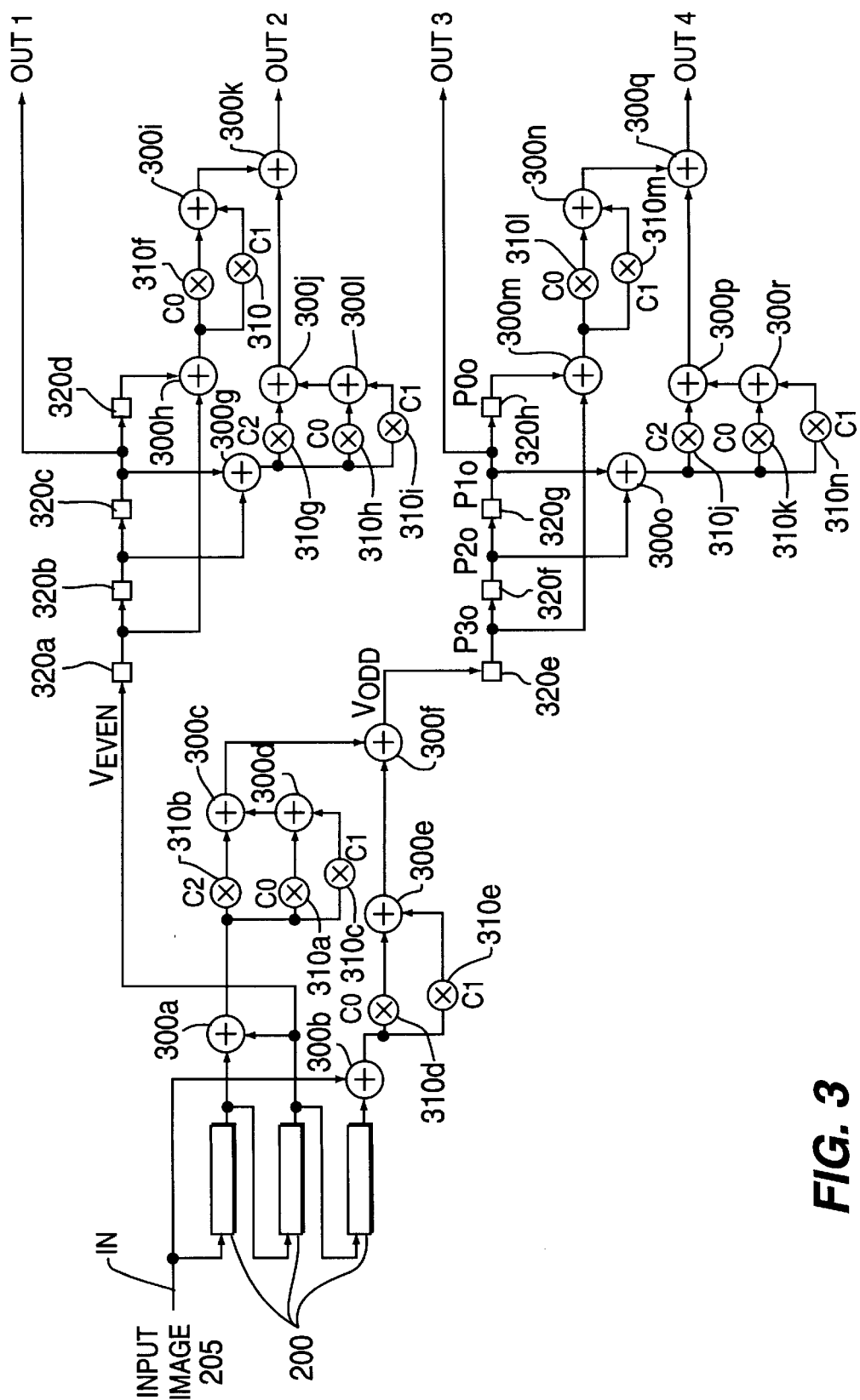
FIG. 3 is a more detailed block diagram of upsampler 10 shown in FIG. 2.

FIG. 3 is a more detailed block diagram of upsampler 10 shown in FIG. 2. Pixel values from a line of the input image signal 205 are provided to input terminal IN. The lines of the input image signal 205 are processed through line delays 200, adders 300a–300f, and multipliers 310a–310e to vertically interpolate the odd lines of the input image and produce vertically interpolated lines odd which become the odd numbered lines of the upsampled image 207, shown in FIG. 1. Coefficients C0, C1, and C2 are 1/16, 1/32, and 1/2, respectively. The output signal Veven of the upsampler 10 are not vertically filtered. These lines become the even numbered lines of the upsampled image 207 and represent the image samples of the input image as they were received.

The even lines Veven are provided to and processed using pixel delays 320a–320d, adders 300h–300l, and multipliers 310f–310i to horizontally interpolate the pixels in the even lines Veven to produce output pixel signal OUT2 which represents the odd pixels in the even lines of the upsampled image 207, shown in FIG. 1. The even pixels in the output image signal are not horizontally interpolated and are provided as output pixel signal OUT1. The vertically interpolated lines Vodd are provided to and processed using pixel delays 320e–320g, adders 300m–300r, and multipliers 310j–310n to produce horizontally interpolated odd pixels in the vertically interpolated lines Vodd to produce output pixel signal OUT4. The pixels of the vertically interpolated lines Vodd are also provided, without further interpolation, as pixel signal OUT3.

FIG. 4 illustrates the conceptual operation of upsampler 10 shown in FIGS. 2 and 3. FIG. 4 is a spatial domain representation of the sampled images which illustrates upsampling by a factor of two (N =2). Zero data values are inserted into the input image signal 205, as shown in FIG. 4, to produce an intermediate image signal 206. A, B, C, and D represent pixel values in the input image signal 205. Intermediate image signal 206 is low-pass filtered to produce upsampled image signal 207 having pixel values A, B, C, and D plus interpolation pixel values I. By implementing this conceptual process, the Nyquist sampled image 205 is critically sampled.

Inserting zeros into the input image signal 205 compresses the Fourier transform of the image by a factor of two as is shown in FIGS. 5(a)–5(c). FIGS. 5(a)–5(c) are respective Fourier transforms of the input image signal 205, intermediate image signal 206, and upsampled image signal 207. A comparison of FIGS. 5(a) and 5(c) demonstrates that region 400, shown in FIG. 5(a), over which the Fourier transform of the input image signal 205 extends is reduced in size to region 401 in the upsampled image signal 207, shown in FIG. 5(c). Further, as is shown in FIG. 5(c), a single copy of the compressed transform centered around every integer multiple of $2\pi$ remains after the intermediate image 206 is low pass filtered.

The upsampling kernel is a low-pass filter, with a cutoff frequency determined by the extent to which the input image signal 205 is upsampled. The low-pass filter eliminates frequencies except those compressed copies of the original signal that are centered on integer multiples of $2\pi$. If the frequency characteristics of the interpolation method employed in the warper 20, shown in FIG. 1, are known, a better upsampling kernel can be selected to provide an overall warper system 5 with less image degradation.

The upsampling kernel is selected to compensate for the deviations from a perfect low-pass reconstruction filter that may exist in the warper 20. For example, if the warping interpolation method is bilinear, described below, after upsampling, there will be a slight attenuation of the high spatial frequencies. The upsampling kernel of upsampler 10 is chosen to slightly peak these same frequencies to minimize the overall warper system 5 effect on the high spatial frequencies. Thus, if the warp interpolation method is known, an upsampling kernel for upsampler 10 can be selected to compensate for these deviations from a perfect low-pass filter by pre-amplifying or pre-attenuating frequencies in the input image signal 205. In this way, the overall degradation of the system can be reduced.

Different warp transforms attenuate different high spatial frequencies when bilinear interpolation is used. For example, a half-pixel translation causes the most attenuation of the high spatial frequencies while integer translations have no attenuation. A single upsampling kernel between these to extremes can be selected to improve the overall image quality for different transforms.

The upsampler generates pixel values in the upsampled image signal 207 at four times the rate pixels in the input image are provided to upsampler 10. Pixel values from the input image signal 205 are provided to upsampler 10, shown in FIG. 1, at a rate of one pixel per clock cycle and supplied from upsampler 10 at four pixels per clock cycle. The four pixels are provided to warper 20, shown in FIG. 1, and stored in, for example, separate memories 600a–600d, shown in FIG. 6, as explained below.

Figures 4A, 6:
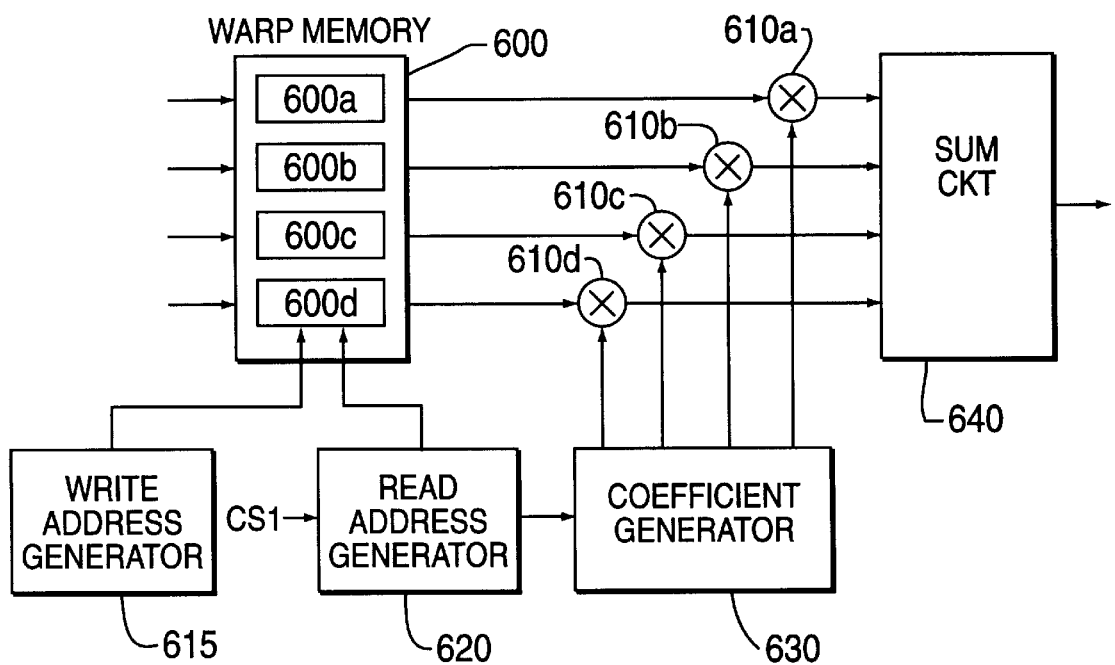
FIG. 4a is a representation of the upsampled image signal 207 where the pixel values in the upsampled image signal 207 have been renumbered.
FIG. 6 is a block diagram of warper 20 shown in FIG. 1 according to an exemplary embodiment of the present invention.

Warper 20, shown in FIG. 1, warps the upsampled image signal 207, shown in FIG. 4. Warper 20 is described with reference to FIG. 6. In FIG. 6, the pixel values of the upsampled image signal 207 are stored in memories 600a–600d so than each one of the memories stores one fourth of the upsampled image 207. The pixels in the warped image are interpolated from the stored pixel values using bilinear interpolation. Because the warp memory 600 is implemented as four separate memories 600a–600d, for use by the bilinear interpolation, the upsampled image signal 207, shown in FIG. 4, can be stored in the warp memory 600 at four pixels per clock cycle. In this way, no backlog delay is incurred in the upsampler 10, shown in FIG. 1.

Figure 7:
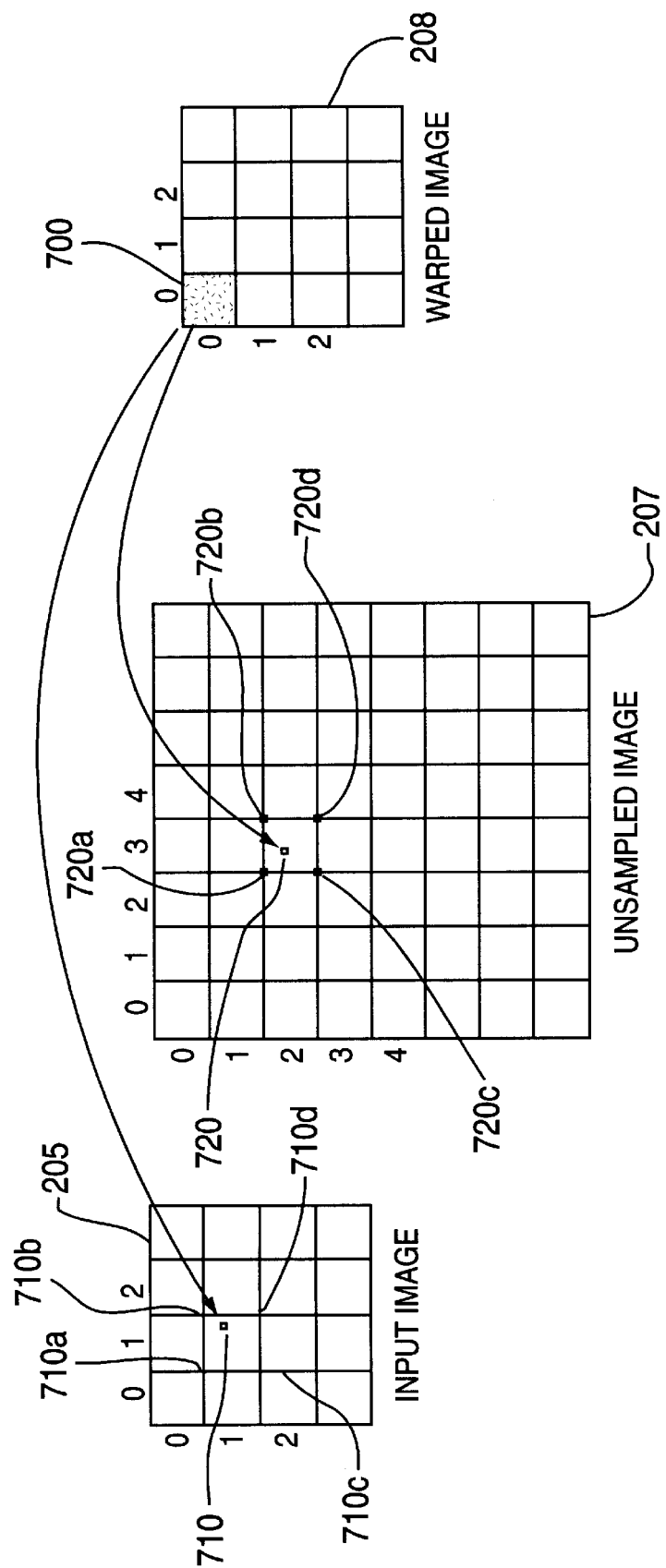
FIG. 7 is a data structure diagram illustrating the input image, the upsampled image, and the warped image.

Bilinear interpolation uses a local neighborhood of four pixels and a weighted average of those four pixels for the interpolation. The neighborhood of pixel values are the nearest pixel values to the source pixel value. The source pixel value 720 and the four closest neighbor pixel values 720a–720d in the upsampled image are shown in FIG. 7. Input image 205 and upsampled image 207 have a pixel value at each vertex formed by the horizontal and vertical lines shown in FIG. 7. Pixel value 700 is a pixel value in warped image 200 which corresponds to source pixel 720. Pixel 700 also corresponds to pixel 710 in the input image.

In a real-time implementation, four pixel values (720a, 720b, 720c and 720d) stored in the warp memory are retrieved at substantially the same time every clock cycle for use by the bilinear interpolator. These pixel values are then multiplied by the appropriate weights and summed to produce a pixel value in the intermediate warper image. The pixel values of the upsampled image signal 207 are stored in memories 600a–600d so that every grouping of the nearest pixel values 720a–720d to the source pixel value may be accessed concurrently.

Write address generator 615, shown in FIG. 6, produces addresses for storing the pixel values in the upsampled image signal 207 in memories 600a–600d. Upsampler 10, shown in FIG. 1, produces a two-by-two array of pixel values [$(A_{k,l}, E_{k,l}, F_{k,l}, G_{k,l}), (B_{k,l}, E_{k,l}, F_{k,l}, G_{k,l}), (C_{k,l}, E_{k,l}, F_{k,l}, G_{k,l}),$ or $(D_{k,l}, E_{k,l}, F_{k,l}, G_{k,l})$] for each pixel value in the input image signal 205, shown in FIG. 7, where k and l are integers. The four pixels in the two-by-two array are stored in separate memories 600a–600d at the same address in each memory 600a–600d and at substantially the same time. In the exemplary embodiment of the invention this is implemented by storing each of the output samples, OUT1, OUT2, OUT3 and OUT4 of the upsampler 10, shown in FIG. 3 in a respective memory 600a, 600b, 600c, and 600d.

For example, assume the input image has 256 pixel values by 256 pixel values and the input is upsampled by a factor of two. Then the upsampled image 207, shown in FIG. 7, has 512 pixel values by 512 pixel values where each square grouping of pixels 210, shown in FIG. 4, has a pixel located in a separate memory. The pixels values shown in FIG. 4 are stored in memories 600a–600d. FIG. 4a is a representation of the upsampled image signal 207 where the pixel values in the upsampled image signal 207, shown in FIG. 4, have been renumbered as Z1 through Z4 for describing where the pixel values in the upsampled image are stored in memories 600a–600d.

Each memory address $x_p$ and $y_p$ is twelve bits if the maximum size is $2^{12} \times 2^{12}$ (4096×4096). Each memory address $x_p$ and $y_p$ includes a least significant address bit $x_0$ and $y_0$ which together specify the memory 600a–600d in which the pixel value is stored and location address bits $x_{11-1}$ and $y_{11-1}$ which together specify the address at which the pixel values are stored. The mapping of address bits $x_0$ and $y_0$ into memories 600a–600d is shown in Table 1 below.

TABLE 1

| $x_n$ | $y_n$ | MEMORY |
|---|---|---|
| 0 | 0 | 600a |
| 0 | 1 | 600b |
| 1 | 0 | 600c |
| 1 | 1 | 600d |

FIG. 4a and Table 2 below illustrate the arrangement of the pixel values of the upsampled image 207 in memories 600a–600d addresses x[11-1] and y[11-1].

TABLE 2

| x[11-1] | y[11-1] | MEMORY 600A | MEMORY 600B | MEMORY 600C | MEMORY 600D |
|---|---|---|---|---|---|
| 0 | 0 | $Z1_{0,0}$ | $Z2_{0,0}$ | $Z3_{0,0}$ | $Z4_{0,0}$ |
| 0 | 1 | $Z1_{0,1}$ | $Z2_{0,1}$ | $Z3_{0,1}$ | $Z4_{0,1}$ |
| 0 | 2 | $Z1_{0,2}$ | $Z2_{0,2}$ | $Z3_{0,2}$ | $Z4_{0,2}$ |
| . | . | . | . | . | . |
| . | . | . | . | . | . |
| . | . | . | . | . | . |
| 0 | 255 | $Z1_{0,255}$ | $Z2_{0,255}$ | $Z3_{0,255}$ | $Z4_{0,255}$ |
| 1 | 0 | $Z1_{1,0}$ | $Z2_{1,0}$ | $Z3_{1,0}$ | $Z4_{1,0}$ |
| 1 | 1 | $Z1_{1,1}$ | $Z2_{1,1}$ | $Z3_{1,1}$ | $Z4_{1,1}$ |
| . | . | . | . | . | . |
| . | . | . | . | . | . |
| . | . | . | . | . | . |
| 1 | 255 | $Z1_{1,255}$ | $Z2_{1,255}$ | $Z3_{1,255}$ | $Z4_{1,255}$ |
| 2 | 0 | $Z1_{2,0}$ | $Z2_{2,0}$ | $Z3_{2,0}$ | $Z4_{2,0}$ |
| . | . | . | . | . | . |
| . | . | . | . | . | . |
| . | . | . | . | . | . |
| 255 | 255 | $Z1_{255,255}$ | $Z2_{255,255}$ | $Z3_{255,255}$ | $Z4_{255,255}$ |

For example, memory address $[(x_{11-1}, x_0), (Y_{11-1}, Y_0)] = [(1, 0), (255, 0)]$ is pixel value $Z1_{1,255}$ stored in memory 600a.

Once the upsampled image signal 207 has been stored in memories 600a–600d, it may be warped by warper 20. The generation of pixel value 700 in the warped image 208, shown in FIG. 7, is described below with reference to FIG. 8.

First, at step 800, the address value A[x,y] of the source pixel value 720 in the upsampled image is generated. x and y are coordinates of the source pixel value 720 in the upsampled image and are used as an address to memories 600a–600d described above with reference to Tables 1 and 2. In response to the transform to be implemented, address generator 620 generates an address value A[x,y] for the source pixel value 720 in the upsampled image 207, shown in FIG. 7. For example, the input image 205 can be transformed in the spatial domain using a geometric transformation illustrated in equations (1) and (2) below.

$$x[u,v] = a_x + b_x \cdot u + c_x \cdot v + d_x \cdot u^2 + e_x \cdot v^2 + f_x \cdot u \cdot v \quad (1)$$

$$y[u,v] = a_y + b_y \cdot u + c_y \cdot v + d_y \cdot u^2 + e_y \cdot v^2 + f_y \cdot u \cdot v \quad (2)$$

u and y are coordinates of a pixel value in the intermediate warped image signal and $a_x$, $b_x$, $c_x$, $d_x$, $e_x$, $f_x$, $a_y$, $b_y$, $c_y$, $d_y$, $e_y$, and $f_y$ are constant coefficient values. The transform equations are provided to the address generator 620 via control signal CS1 which is provided via an interface (not shown). Alternatively, the transform equations can be stored in a memory (not shown) in address generator 620.

Equations (1) and (2) are implemented using the pseudo code in Table 3 below.

TABLE 3

```
/*Initialize at the start of image warp:*/
x[0,0] = a_x
acce_x[0] = 0
accf_x[0] = 0
acce_x[1] = e_x + c_x
/*Compute before the start of each line in the
  warped image:*/
acce_x[v] = acce_x[v-1] + 2e_x
```

TABLE 3-continued

```
x[0,v] = x[0,v-1] + acce_x[v]
accf_x[v] = accf_x[v-1] + f_x
/*Initialize before each line of the warped image
  and after step 20: */
accd_x[0] = 0
accd_x[1] = b_x + d_x + accf_x[v]
/*Compute for each pixel in the warped image:*/
accd_x[u] = accd_x[u-1] + 2d_x
x[u,v] = x[u-1,v] + accd_x[u]
```

In Table 3, x[u,v] is the x-coordinate of address value A[x,y] in the upsampled image 207 which corresponds to a pixel value in the intermediate warped image signal shown in FIG. 1. This intermediate signal corresponds to the warped image 208 prior to down sampling by down sampler 30 shown in FIG. 1. The y-coordinate y[u,v] is generated using the pseudo code in table 3 except x[u,v] in Table 3 is replaced with y[u,v] and the "x" subscripts are replaced with "y" subscripts.

The pseudo code in Table 3 can be implemented in hardware using two adders including four accumulator registers for each computation to produce values x[u,v] and y[u,v]. The precision of the address generation is high, for example, 32 to 48 bits, depending on the system requirements and accuracy required for the generation of the warped image 208, shown in FIG. 7.

The address value A[x,y] has an integer part $S_x$ and $S_y$, and a fractional part $T_x$ and $T_y$ because the address value A[x,y] identifies the location of the source pixel 720 in the upsampled image 207, shown in FIG. 7, with sub-pixel precision. $S_x$ and $S_y$ are the respective integer parts of the coordinate values x and y and $T_x$ and $T_y$ are the respective fractional parts of the coordinate values x and y. The integer part $S_x$ and $S_y$ of the address value A[x,y] is used to select the two-by-two pixel neighborhood of the source pixel value at address value A[x,y]. The fractional part $T_x$ and $T_y$ of the address value A[x,y] is used to compute the interpolation coefficients that are provided to the bilinear interpolator. Interpolation coefficient values weight the pixel values in the two-by-two pixel neighborhood to produce the pixel value in the intermediate warped image shown in FIG. 1.

At step 810, after the address value A[x,y] has been generated, it is determined whether the source pixel 720 corresponds to one of the pixel values in the upsampled image signal 207. If so, the pixel value in the warped image is selected as the pixel value in the intermediate warped image signal. For example, if the address value A[x,y] identifies pixel value 720*a*, shown in FIG. 7, as the source pixel, then pixel value 720*a* is selected. Otherwise step 830 is performed.

At step 830, the two-by-two pixel neighborhood 720*a*–720*d* of the source pixel 720 is selected. The above-referenced article by Gomez describes one method for selecting and retrieving the two-by-two pixel neighborhood from four separate memories.

As shown in FIG. 7, source pixel 720 is located within a two-by-two neighborhood of pixels 720*a*–720*d* which are used to produce the pixel value in the intermediate warped image signal. The four pixels 720*a*–720*d* which make up the two-by-two neighborhood are located in separate memories 600*a*–600*d*. FIG. 9 is an enlarged view of a portion of the upsampled image 207 shown in FIG. 7. Address generator 620 uses the upper left-most pixel as a nearest neighbor of the two-by-two neighborhood. The nearest neighbor is the starting position from which the address value for each pixel value 720*a*–720*d* in memories 600*a*–600*d* is determined. FIGS. 9(*c*)–9(*f*) illustrate the four different positions of source pixel 720 as it relates to pixel values 720*a*–720*d* which form the two-by-two neighborhood. A pixel value of the upsampled image is located at each vertex created by the vertical and horizontal lines in FIGS. 9(*c*)–9(*f*). FIGS. 9(*a*)–9(*d*) also show in which memory 600*a*–600*d* each pixel value 720*a*–720*d* of the two-by-two neighborhood is stored.

The integer part $S_x$ and $S_y$ of the address value A[x,y] of the source pixel value 720 is used to determine the addresses of the two-by-two neighborhood in memories 600*a*–600*d*. Particularly, the least significant bit of the integer part $S_x$[0] and $S_y$[0] are used to determine the addresses. When, as shown in FIG. 9, the nearest neighbor is stored in memory 600*a*, the address of each one of the pixel values 720*a*–720*d* in the two-by-two neighborhood is determined in accordance with Table 4 below.

TABLE 4

| Memory | X Component Address | Y Component Address |
|---|---|---|
| Memory 600a | $S_x$[11-1] | $S_y$[11-1] |
| Memory 600b | $S_x$[11-1] | $S_y$[11-1] |
| Memory 600c | $S_x$[11-1] | $S_y$[11-1] |
| Memory 600d | $S_x$[11-1] | $S_y$[11-1] |

In Table 4, $S_x$[11-1] are the eleven most significant bits of the x component part calculated using equation (1) and $S_y$[11-1] are the eleven most significant bits of the y component part calculated in accordance with equation (2).

The addresses of pixel values 720*a*–720*d* in memories 600*a*–600*d* are determined in accordance with Table 5 if the nearest neighbor to source pixel value 720 is stored in memory 600*b*.

TABLE 5

| Memory | X Component Address | Y Component Address |
|---|---|---|
| Memory 600a | $S_x$[11-1] + 1 | $S_y$[11-1] |
| Memory 600b | $S_x$[11-1] | $S_y$[11-1] |
| Memory 600c | $S_x$[11-1] + 1 | $S_y$[11-1] |
| Memory 600d | $S_x$[11-1] | $S_y$[11-1] |

The addresses of pixel values 720*a*–720*d* in memories 600*a*–600*d* are determined in accordance with Table 6 if the nearest neighbor to source pixel value 720 is stored in memory 690*c*.

TABLE 6

| Memory | X Component Address | Y Component Address |
|---|---|---|
| Memory 600a | $S_x$[11-1] | $S_y$[11-1] + 1 |
| Memory 600b | $S_x$[11-1] | $S_y$[11-1] + 1 |
| Memory 600c | $S_x$[11-1] | $S_y$[11-1] |
| Memory 600d | $S_x$[11-1] | $S_y$[11-1] |

The addresses of pixel values 720*a*–720*d* in memories 600*a*–600*d* are determined in accordance with Table 7 if the nearest neighbor to source pixel value 720 is stored in memory 600*d*.

TABLE 7

| Memory | X Component Address | Y Component Address |
|---|---|---|
| Memory 600a | $S_x$[11-1] + 1 | $S_y$[11-1] + 1 |
| Memory 600b | $S_x$[11-1] | $S_y$[11-1] + 1 |
| Memory 600c | $S_x$[11-1] + 1 | $S_y$[11-1] |
| Memory 600d | $S_x$[11-1] | $S_y$[11-1] |

After the addresses of each of the pixel values 720*a*–720*d* stored in memories 600*a*–600*d* are determined, the pixel values 720*a*–720*d* are retrieved from memories 720*a*–720*d*.

Next, at step 840, the interpolation coefficient values I1, I2, I3, and I4 are produced using the fractional parts $T_x$ and $T_y$ of address value A[x,y]. Interpolation coefficients I1, and I2, I3, and I4 are produced using equations (3)–(6) below.

$$I1 = (1 - T_x) \cdot (1 - T_y) \tag{3}$$

$$I2 = T_x \cdot (1 - T_y) \tag{4}$$

$$I3 = (1 - T_x) \cdot T_y \tag{5}$$

$$I4 = T_x \cdot T_y \tag{6}$$

Alternatively, interpolation coefficient values I1–I4 can be stored in a look-up table in coefficient generator 630. The fractional parts $T_x$ and $T_y$ of the address value A[x,y] are used as an address to the interpolation coefficient values stored in the look-up table. The above-referenced paper by Gomez describes one method for using the fractional parts $T_x$ and $T_y$ of the address value A[x,y] as an address for retrieving interpolation coefficient values from a look-up table.

Returning to FIG. 8, at step 850, the source pixel value 720 is produced using the interpolation coefficients I1–I4 and the two-by-two neighborhood of pixels 720*a*–720*d*, shown in FIG. 7, retrieved from memories 600*a*–600*d*. As is shown in FIG. 6, pixel value 720*a* from memory 600*a* and interpolation coefficient value I1 are multiplied at multiplier 610*a*. Pixel value 720*b* from memory 600*b* and interpolation coefficient value I2 are multiplied at multiplier 610*b*. Pixel value 720*c* from memory 600*c* and interpolation coefficient value I3 are multiplied at multiplier 610c. Pixel value 720d from memory 600d and interpolation coefficient value I4 are multiplied at multiplier 610d. The output values provided from multipliers 610a–610d are added together by sum circuitry 640 to produce source pixel 720, shown in FIG. 7.

Figure 8:
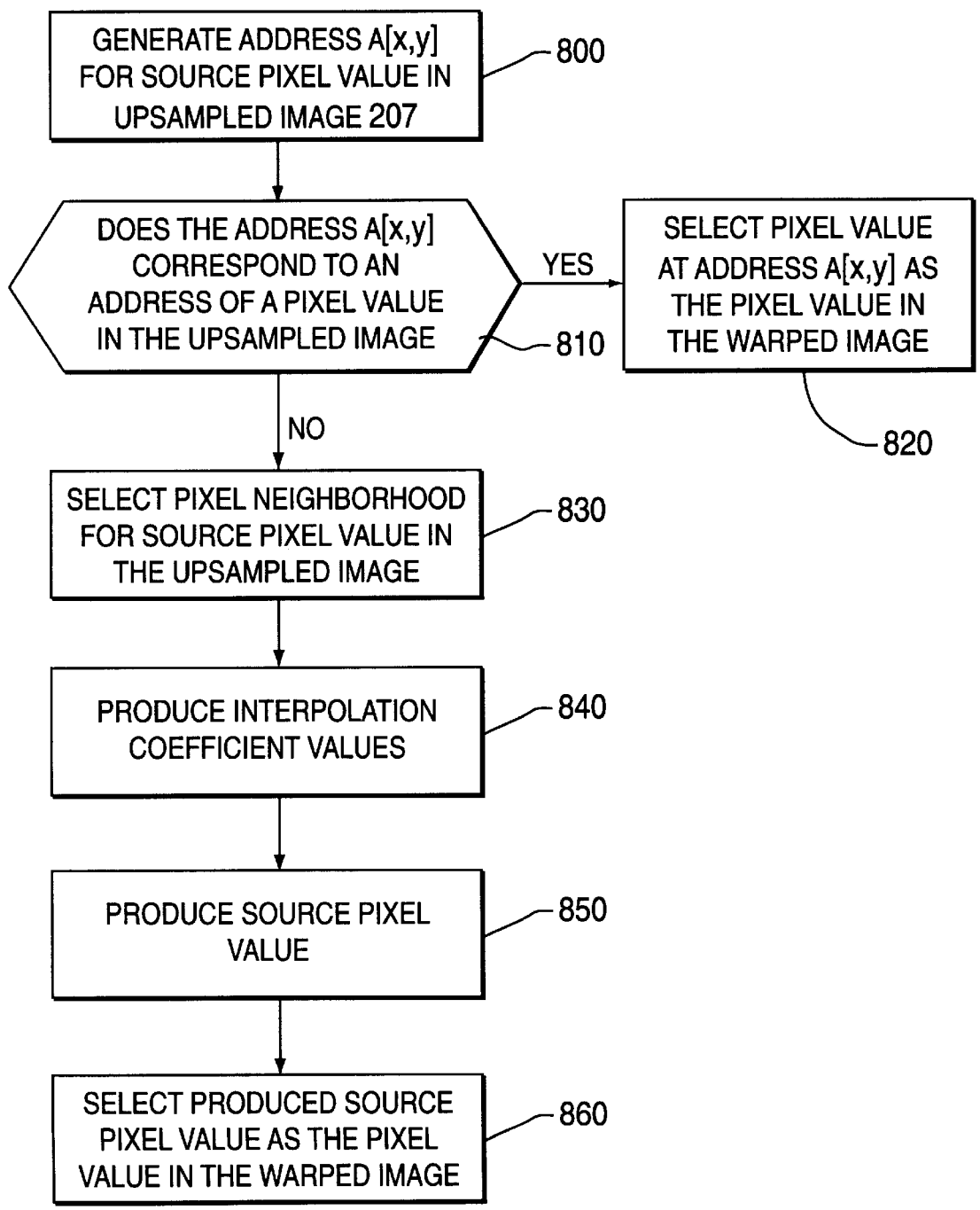
FIG. 8 is a flow chart diagram illustrating the operation of warper 20 shown in FIG. 1 in accordance with an exemplary embodiment of the present invention.

At step 860 in FIG. 8, the source pixel 720 is selected as a pixel value in the intermediate warped image signal. Steps 800 through 860 are then repeated to produce each pixel in the warped image 208.

Down sampler 30 reduces the number of samples in the intermediate warped image signal by the same factor the input image signal is upsampled. For example, if the input image signal is upsampled by two, then the intermediate warped image is down sampled by two. FIG. 9(a) shows respective Fourier transforms of the upsampled image signal 207, the intermediate warped image, and the warped image 700 illustrating the operation of the down sampler 30. FIG. 9(b) shows Fourier transform of a input image signal using a bilinear interpolation which does not include upsampling the input image signal. A comparison of the warped image signals shown in FIGS. 9(a) and 9(b) illustrates that the warped image signal produced using upsampling prior to transformation and down sampling after transformation produces a warped signal with better frequency characteristics than a warped signal which does not use upsampling and down sampling.

Alternatively, the down sampler 30 and the warper 20 can be combined into a single component or step. In this case, the address value A[x,y] is adjusted by the interpolation factor $2^N$ to account for the interpolation of the input image signal 205. For example, the standard geometric transformation specifies that a pixel value in the warped image signal should come from a pixel value in the input image signal at location A[x=X1, y=Y1). This pixel value is at a non-integral location in the input image and, thus, is determined by interpolation using the neighborhood pixels. The same pixel value in the upsampled image signal 207 is accessed by multiplying the referenced address by 2. In this case, the address value to reference in the upsampled source image would be A[x=2·x1, y=2·Y1). If the image was upsampled by a factor of 4, the referenced address would be multiplied by 4. Then a neighborhood of pixels around this address is used to determine the output value. The neighborhood of pixel values in the upsampled image corresponds to sample points of the original analog image that are closer to the location of the source pixel than an equal sized neighborhood of pixel values in the input image signal.

Figure 10:
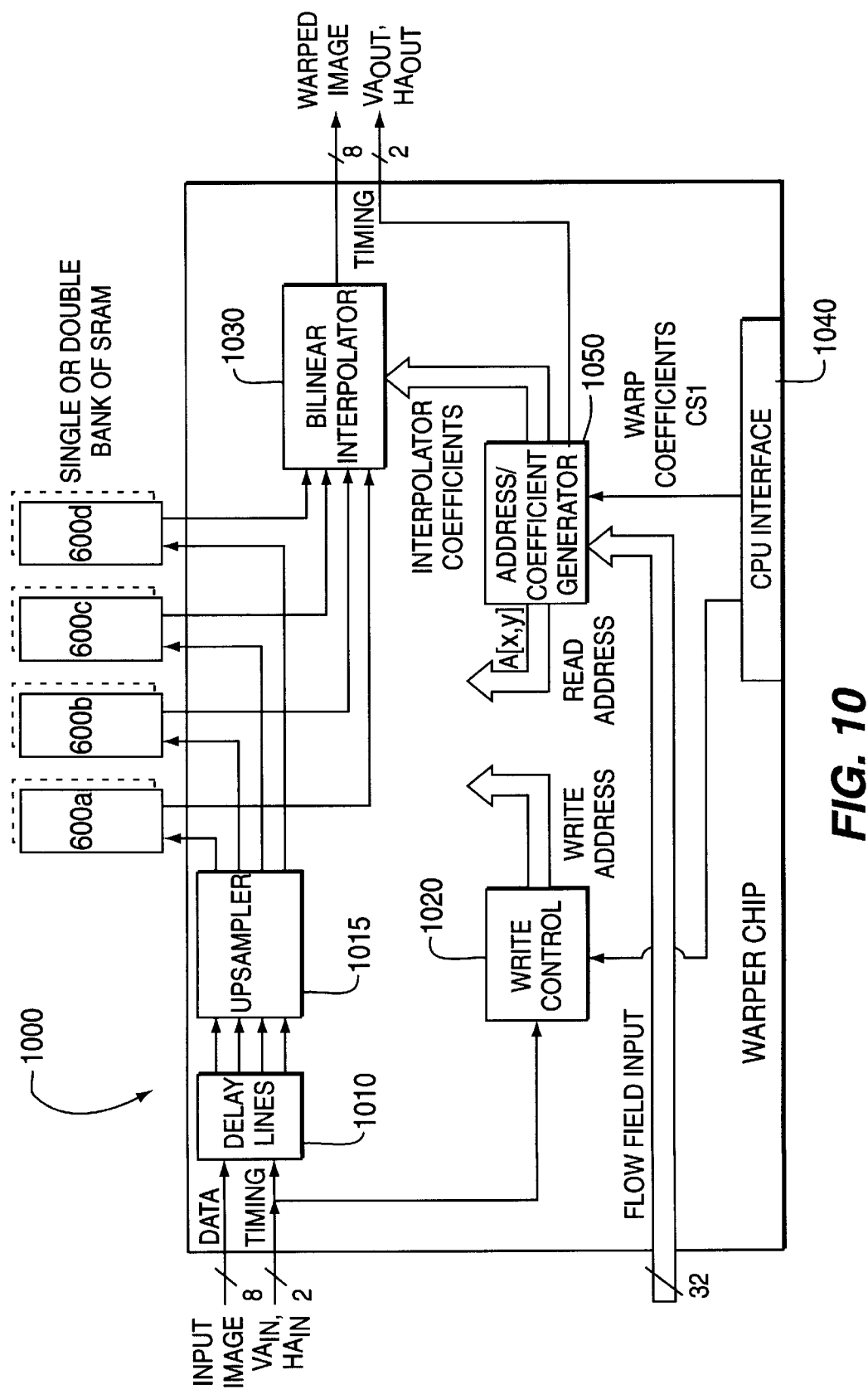
FIG. 10 is a block diagram of another exemplary embodiment of the present invention directed to a digital image warper implemented on a single integrated circuit (chip).
Figure 11:
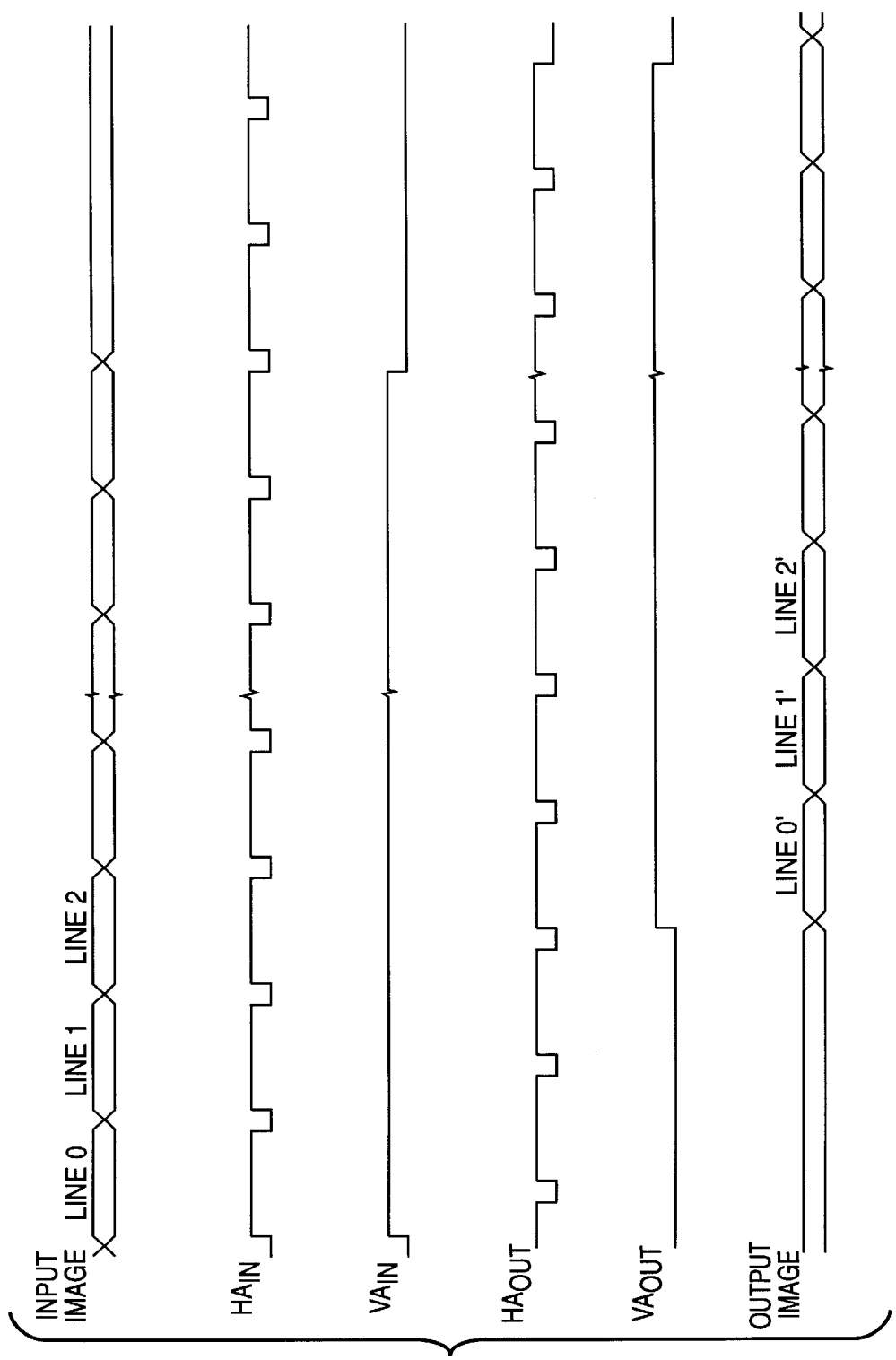
FIG. 11 is a timing diagram useful for explaining the operation of the warper chip of FIG. 10.

FIG. 10 is another exemplary integrated circuit embodiment of the present invention directed to a warper chip 1000. Warper chip 1000 is provided with the input image signal which is a multi-bit digital signal containing at least eight data bits and two timing bits. The two timing bits convey respective timing signals. One signal, $HA_{in}$, is in a logic high state when the data in a line is valid (i.e. during the active line interval) and in a logic low state otherwise (i.e. during the horizontal blanking interval). The other signal, $VA_{in}$, is in a logic high state when the data in a field is valid and in a logic low state otherwise (i.e. during the vertical blanking interval). FIG. 11 is a timing diagram which illustrates the relative timing of the input image signal and the warped image signal, and the signals HA and VA for those signals. The warper chip uses the timing signals HA and VA in the same manner as described in U.S. Pat. No. 5,359,674, entitled PYRAMID PROCESSOR INTEGRATED CIRCUIT, issued to van der Wal, which is herein incorporated by reference for its teachings on processing signals having timing bits.

In one implementation, the timing signals HA and VA remain associated with the input image signal as the input image signal is processed by the warper chip 1000. As a result, when the warped image signal is produced, the vertical and horizontal blanking periods of the warped image signal do not need to be generated because the relative timing of the warped image signal is maintained by associating the timing signals HA and VA with the input image signal as it is processed. Thus, less circuitry is required. In another implementation, the upsampling and the storing process may be uncoupled from the warping and interpolation process, in which case the HA and VA timing signals for the output have to be re-generated. A further description of the use of the timing signals is omitted.

The exemplary embodiment is not limited to processing multi-bit digital signals containing eight data bits and two timing bits. The exemplary embodiment can be configured to receive multi-bit digital signals containing, for example, ten data bits and two timing bits.

Referring to FIG. 10, the input image signal is provided to delay 1010 and upsampler 1015. Delay 1010 is the same as delay 200 shown in FIG. 2 and upsampler 1015 is the combination of vertical filter 210 and 220, shown in FIG. 2, and horizontal filters 230 and 240, shown in FIG. 2. Delay 1010 and upsampler 1015 operate the same as these components. Memories 600a–600d are the same as memories 600a–600d shown in FIG. 6 and are a single or double bank of SRAM. Bilinear interpolator is a combination of multipliers 610a–610d and sum circuitry 640 shown in FIG. 6.

Address/coefficient generator 1050 operates the same as address generator 630 and coefficient generator 630 shown in FIG. 6 except that address/coefficient generator 1050 may also receive a flow field input. The flow field input provides a two-dimensional vector for each output pixel. The flow field vector is added to the warp address generated by the address/coefficient generator 1050 to allow completely general image transformations or to provide general modifications to the computed data of the address/coefficient and generator. Address/coefficient generator 1050 also receives control signals CS1 from CPU interface 1040. Warp coefficients such as constant coefficient values $a_x$, $b_x$, $C_x$, $d_x$, $e_x$, $f_x$, $a_y$, $b_y$, $C_y$, $d_y$, $e_y$, and $f_y$ are provided to generate address values A[x,y]. Address values A[x,y] are used to retrieve pixel values from memories 600a–600d as described above with reference to write address generator 615 shown in FIG. 6. Write address generator 1020 is also coupled to CPU interface 1040 which provides data that specifies which segment of the input image is to be processed and stored in memories 600a–600d. Write control logic 1020 provides the write address shown in Tables 1 and 2 for writing the pixel values in the upsampled image to memories 600a–600d. Based on the timing signals $HA_{in}$ and $VA_{in}$ and the program interface which specifies which segment of the input image signal should be stored, the write control logic 1020 generates the addresses to store the pixel values in memories 600a–600d in the same manner as described above.

In another exemplary embodiment of the present invention, the circuitry shown in FIGS. 1 and 10 may be used to perform multiple image plane warping. In many applications it is desirable to warp multiple image planes such as the separate planes of a color image. This can be achieved by using multiple warper chips 1000, shown in FIG. 10, or multiple warper systems 5, shown in FIG. 1, in parallel. Alternatively, if the processing rate of the warper chip 1000 or warping system 5 is fast enough, the warping operations on part or all the image planes can be interleaved. As a result, a single warper chip 1000 or warper system 5 can be used.

Interleaving multi-plane images is described below using a RGB input image signal and FIG. 10. The input image signal includes, for example, three image planes R, G, and B, where the image planes R, G, and B are interleaved for every pixel for each line of the input image signal as shown in Table 8 below

TABLE 8

| Line 0 | R[0,0] | G[0,0] | B[0,0] | R[1,0] | G[1,0] | B[1,0] | ... |
|---|---|---|---|---|---|---|---|
| . | . | . | . | . | . | . | ... |
| . | . | . | . | . | . | . | ... |
| . | . | . | . | . | . | . | ... |
| Line n | R[0,n] | G[0,n] | B[0,n] | R[1,n] | G[1,n] | B[1,n] | ... |

By increasing line delays 1010 by a factor of three or using three line delays for each line delay 200, upsampler 1015 can operate on the input image signal in an interleaved fashion. The upsampled image is stored in memories 600a–600d in the same manner as described above except that the pixel values are stored in an interleaved fashion. Table 9 illustrates how the pixel values of the three planes are stored in memories 600a–600d.

TABLE 9

| MEMORY 600A | MEMORY 600B | MEMORY 600C | MEMORY 600D |
|---|---|---|---|
| $R_{0,0}$ | $R_{0(o),0}$ | $R_{0,0(o)}$ | $R_{0(o),0(o)}$ |
| $G_{0,0}$ | $G_{0(o),0}$ | $G_{0,0(o)}$ | $G_{0(o),0(o)}$ |
| $B_{0,0}$ | $B_{0(o),0}$ | $B_{0,0(o)}$ | $B_{0(o),0(o)}$ |
| . | . | . | . |
| . | . | . | . |
| . | . | . | . |
| $R_{m,n}$ | $R_{m(o),n}$ | $R_{m,n(o)}$ | $R_{m(o),n(o)}$ |
| $G_{m,n}$ | $G_{m(o),n}$ | $G_{m,n(o)}$ | $G_{m(o),n(o)}$ |
| $B_{m,n}$ | $B_{m(o),n}$ | $B_{m,n(o)}$ | $B_{m(o),n(o)}$ |
| $R_{m+1,n}$ | $R_{m(o)+1,n}$ | $R_{m+1,n(o)}$ | $R_{m(o)+1,n(o)}$ |
| $G_{m+1,n}$ | $G_{m(o)+1,n}$ | $G_{m+1,n(o)}$ | $G_{m(o)+1,n(o)}$ |
| $B_{m+1,n}$ | $B_{m(o)+1,n}$ | $B_{m+1,n(o)}$ | $B_{m(o)+1,n(o)}$ |
| . | . | . | . |
| . | . | . | . |
| . | . | . | . |
| $R_{255,255}$ | $R_{255(o),255}$ | $R_{255,255(o)}$ | $R_{255(o),255(o)}$ |
| $G_{255,255}$ | $G_{255(o),255}$ | $G_{255,255(o)}$ | $G_{255(o),255(o)}$ |
| $B_{255,255}$ | $B_{255(o),255}$ | $B_{255,255(o)}$ | $B_{255(o),255(o)}$ |

In Table 9 "(o)" represents the odd horizontal and vertical outputs of upsampler 1015. The integer part of the address value A[x,y] generated by address/coefficient generator 1050 is multiplied by three to account for the change in address created by the addition of the other image planes in memories. In addition, address/coefficient generator 1050 repeats the same operation three times: once for the calculated address value A[x,y], then for the address value A[x,y] incremented by one, and then for the address value A[x,y] incremented by two. The warped image signal includes color image data in an interleaved fashion.

For the above example, the warper chip operates at three times the clock rate of the incoming pixel rate of a single image plane. If the RGB image planes in the input image signal are only available in parallel data paths, the image data is interleaved prior to processing. After the warper image signal is produced, the warped image signal is de-interleaved to restore the image planes to parallel data paths.

Another example of interleaved operation of the warper chip 1000 is described below where the input image signal is an color image in Dl format, where the three image data planes are interleaved in a slightly different manner. The input image signal includes, for example, three image planes Y, U, and V, where the image planes Y, U, and V are interleaved as . . . U[n,m], Y[n,m], V[n,m], Y[n+1,m], U[n+2,m], Y[n+2,m], V[n+2,m], Y[n+3,m]. . . . Thus the luminance plane Y has twice the resolution of the two color planes U and V, and the color planes U and V are co-located with the even positions of the luminance plane Y.

This interleaving can be maintained throughout the warper implementation, but the delays and address calculations are slightly different then when operating on the three image planes as described above. The line delays 1010 prior to the upsampler 1015 are twice the size of a line of the luminance plane Y which is four times the size of one line of the color planes U and V. The delay switches every clock cycle between a two-delay element and a four-delay element.

The address/coefficient generator, in turn computes a new address value A[x,y] twice for four successive output values: first for the two color planes U and V and the even position of the luminance plane Y, and then an address value A[x,y] is separately calculated for the odd position of the luminance plane Y. The address value A[x,y] is also offset to appropriately access the correct data planes stored in memories 600a–600d.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

The invention claimed is:

1. A image processing system comprising:
   means for applying an input image signal to the image processing system, said input image signal having an input sampling rate;
   means for uniformly upsampling and filtering all pixels in the input image to increase the sampling rate of the input image signal to at least two times the Nyquist rate, the upsampled image having interpolated values spaced uniformly at predetermined distances from each input sample;
   means for warping the uniformly upsampled image signal to produce an upsampled warped image signal, and
   means for down sampling the upsampled warped image signal to produce a warped image output signal having a sampling rate which is substantially the same as the input image sampling rate.

2. The image processing system according to claim 1, wherein the means for warping includes a bilinear interpolator.

3. The image processing system according to claim 1, wherein the upsampling and filtering means samples the input image signal at a rate of $2^N$ times the Nyquist rate where N is a positive integer.

4. The image processing system according to claim 1, wherein the input image signal has pixel values which are provided to the upsampling and filtering means at one pixel per clock cycle and the upsampling and filtering means produces four upsampled pixel values per clock cycle.

5. The image processing system according to claim 4, wherein the warping means includes four memories and the four upsampled pixel values are stored in respectively different ones of the four memories.

6. The image processing system according to claim 1, wherein the upsampling and filtering means includes a filter for processing the input image signal to counteract deterioration in spatial frequency characteristics caused by the warping means.

7. The image processing system according to claim 1, wherein:
   the input image signal includes pixel values;
   the warping means includes four memories; and
   the upsampling and filtering means further produces four pixel values for each of one the pixel values in the input image signal and stores each one of the four pixel values in a respectively different one of the four memories.

8. The image processing system according to claim 1, wherein:
   the input image signal includes pixel values; and
   the upsampling and filtering means further produces four pixel values for each one of the pixel values in the input image signal where:
   (a) a first one of the four pixel values corresponds to one pixel value in the input image signal,
   (b) a second one of the four pixel values is produced by horizontally interpolating ones of the pixel values in the input image signal,
   (c) a third one of the four pixel values is produced by vertically interpolating ones of the pixel values in the input image signal, and
   (d) a fourth one of the four pixel values is produced by horizontally and vertically interpolating ones of the pixel values in the input image signal.

9. The image processing system according to claim 1, wherein the input image signal includes multiple image planes and the image processing means includes means for spatially interleaving the multiple image planes and wherein the warping means concurrently warps the multiple image planes in an interleaved operation.

10. A image processing system according to claim 1, wherein:
    the means for warping and the means for down sampling operate at substantially the same time.

11. An integrated circuit comprising:
    an input terminal to which an input image signal including pixel values are provided said input image signal having an input sampling rate;
    upsampling and filtering circuitry, coupled to the input terminal, which upsamples the input image signal to at least two times the Nyquist rate to provide an increased sampling rate image signal including pixel values, the increased sampling rate image signal having interpolated pixel values spaced uniformly over the entire input image signal at predetermined distances from each input pixel value;
    write address circuitry which generates a write address signal that specifies a location in a memory where the pixels values are to be stored;
    read address circuitry which generates a read address signal that specifies which ones of the pixels values are to be retrieved from the memory;
    warper circuitry which receives retrieved pixel values from the memory and produces a warped image signal; and
    down sampling circuitry, coupled to the warper circuitry, which produces a warped image output signal, said output signal having an output sampling rate substantially equal to said input sampling rate.

12. The integrated circuit according to claim 11, wherein the down sampling circuitry and the warper circuitry are combined as one circuit.

13. A method for processing an input image signal having an input sampling rate comprising the steps of:
    (a) increasing the sampling rate of the input image signal to at least two times the Nyquist rate by interpolating values spaced uniformly over the entire input image signal at predetermined distances from each input sample;
    (b) warping the upsampled image signal, and
    (c) down sampling the upsampled warped image signal to produce a warped image output signal having an output sampling rate substantially equal to said input sampling rate.

14. The method according to claim 13, wherein step (a) samples the input image signal at a rate of $2^N$ times the Nyquist rate where N is a positive integer.

15. The method according to claim 13, wherein step (a) includes the step of filtering the input image signal to counteract deterioration in the frequency characteristics of the upsampled warped image signal caused by step (b).

16. The method according to claim 13, wherein:
    the input image signal includes pixel values;
    step (a) produces four pixel values for each one of the pixel values in the input image signal, and
    the method further comprises the step of storing each one of the four pixel values in a separate memory.

17. The method according to claim 13, wherein steps (b) and (c) are performed at substantially the same time.

18. An image processing system comprising:
    means for applying an input image signal to the image processing system, said input image signal having an input sampling rate;
    means for uniformly upsampling and filtering to increase the sampling rate of the input image signal, the upsampled image having interpolated values spaced uniformly at predetermined distances from each input sample;
    means for warping the upsampled image signal, and
    means for down sampling the warped image signal to produce a warped image output signal; wherein:
    (a) the input image signal is a digital signal sampled at the Nyquist rate and the upsampling and filtering means increases the sampling rate of the input image signal to at least two times the Nyquist rate, and
    (b) the means for warping includes a bilinear interpolator.

19. An image processing system comprising:
    means for applying an input image signal to the image processing system, and input image signal having an input sampling rate;
    means for uniformly upsampling and filtering to increase the sampling rate of the input image signal, the upsampled image having interpolated values spaced uniformly at predetermined distances from each input sample;
    means for warping the upsampled image signal, and
    means for down sampling the warped image signal to produce a warped image output signal;
    wherein the upsampling and filtering means samples the input image signal at a rate of $2^N$ times the Nyquist rate where N is a positive integer.

20. An image processing system comprising:
    means for applying an input image signal to the image processing system, said input image signal having an input sampling rate;
    means for uniformly upsampling and filtering to increase the sampling rate of the input image signal to at least two times the Nyquist rate, the upsampled image having interpolated values spaced uniformly at predetermined distances from each input sample;

means for warping the upsampled image signal, and means for down sampling the warped image signal to produce a warped image output signal; wherein the input image signal includes pixel values; and the upsampling and filtering means further produces four pixel values for each one of the pixel values in the input image signal where:
  (a) a first one of the four pixel values corresponds to one pixel value in the input image signal,
  (b) a second one of the four pixel values is produced by horizontally interpolating ones of the pixel values in the input image signal,
  (c) a third one of the four pixel values is produced by vertically interpolating ones of the pixel values in the input image signal, and
  (d) a fourth one of the four pixel values in produced by horizontally and vertically interpolating ones of the pixel values in the input image signal.

21. A method for processing an input image signal having an input sampling rate comprising the steps of:
  (a) increasing the sampling rate of the input image signal by interpolating values spaced uniformly at predetermined distances from each input sample;
  (b) warping the upsampled image signal, and
  (c) down sampling the upsampled warped image signal to produce a warped image output signal having an output sampling rate substantially equal to said input sampling rate,
wherein step (a) samples the input image signal at a rate of $2^N$ times the Nyquist rate where N is a positive integer.

* * * * *